US008543405B2

(12) United States Patent
Breuer et al.

(10) Patent No.: US 8,543,405 B2
(45) Date of Patent: Sep. 24, 2013

(54) METHOD OF OPERATING A SPEECH DIALOGUE SYSTEM

(75) Inventors: Richard Breuer, Alsdorf (DE); Martin Halberschmidt, Aachen (DE); Henrik Hodam, Aachen (DE); Martin Prangenberg, Aachen (DE); Olaf Schroeer, Aachen (DE); Peter Vranken, Aachen (DE); Thomas Woehrmann, Aachen (DE)

(73) Assignee: Koninklijke Philips N.V., Eindhoven (NL)

( * ) Notice: Subject to any disclaimer, the term of this patent is extended or adjusted under 35 U.S.C. 154(b) by 2466 days.

(21) Appl. No.: 10/295,122

(22) Filed: Nov. 15, 2002

(65) Prior Publication Data

US 2003/0110041 A1      Jun. 12, 2003

(30) Foreign Application Priority Data

Nov. 20, 2001   (DE) .................................. 101 56 945

(51) Int. Cl.
*G10L 11/00* (2006.01)
*G10L 21/00* (2006.01)

(52) U.S. Cl.
USPC .................... 704/275; 704/270; 704/270.1

(58) Field of Classification Search
USPC ................................................. 704/270–275
See application file for complete search history.

(56) References Cited

U.S. PATENT DOCUMENTS

| 5,167,016 | A | * | 11/1992 | Bagley et al. | 715/531 |
| 5,528,739 | A | * | 6/1996 | Lucas et al. | 715/207 |
| 5,727,175 | A | * | 3/1998 | Malone et al. | 715/763 |
| 5,812,977 | A | * | 9/1998 | Douglas | 704/275 |
| 5,915,001 | A | * | 6/1999 | Uppaluru | 379/88.22 |
| 6,298,324 | B1 | * | 10/2001 | Zuberec et al. | 704/251 |
| 6,438,524 | B1 | * | 8/2002 | Shi | 704/277 |
| 6,493,671 | B1 | * | 12/2002 | Ladd et al. | 704/270 |
| 6,560,576 | B1 | * | 5/2003 | Cohen et al. | 704/270 |
| 6,839,669 | B1 | * | 1/2005 | Gould et al. | 704/246 |
| 6,944,594 | B2 | * | 9/2005 | Busayapongchai et al. | 704/275 |
| 6,980,990 | B2 | * | 12/2005 | Fellman | 707/10 |
| 6,985,865 | B1 | * | 1/2006 | Packingham et al. | 704/275 |
| 7,043,439 | B2 | * | 5/2006 | Jost et al. | 704/275 |
| 2001/0014146 | A1 | | 8/2001 | Beyda | |
| 2001/0032274 | A1 | | 10/2001 | Asami et al. | |
| 2002/0038213 | A1 | * | 3/2002 | Adachi | 704/257 |
| 2003/0110041 | A1 | | 6/2003 | Breuer et al. | |

FOREIGN PATENT DOCUMENTS

| JP | 10334047 A | 12/1988 |
| JP | 08339288 A | 12/1996 |
| JP | 2001296943 A | 10/2001 |
| JP | 2003223187 A | 8/2003 |

* cited by examiner

*Primary Examiner* — Eric Yen

(57) ABSTRACT

The invention relates to a method of operating a speech dialogue system which communicates with a user while a speech recognition device and/or a speech output device and a dialogue control unit are used which unit controls a dialogue run between the user and the speech dialogue system on the basis of a dialogue description (B). According to the invention at least one position (P') that can be reached during a dialogue between the user and the dialogue system is marked in the dialogue run in the speech dialogue system, with which an address (A) belonging to the position (P') is stored with a marker (M) assigned to the position (P') in the dialogue description. At a later entry of the stored marker (M) by the user the speech dialogue system automatically jumps to the assigned address (A) in the dialogue description (B) and proceeds with the dialogue from that respective position (P') onwards. In addition, the invention relates to a speech dialogue system.

17 Claims, 2 Drawing Sheets

METHOD OF OPERATING A SPEECH DIALOGUE SYSTEM

Figure 1:
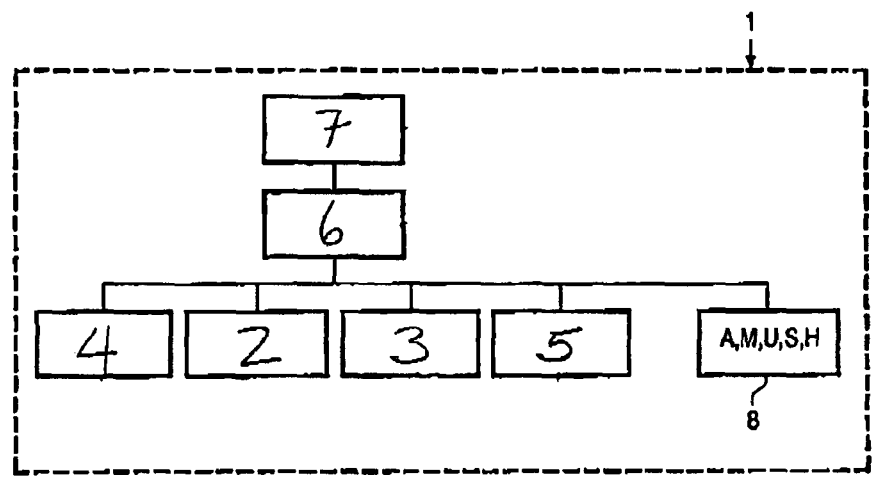

The invention relates to a method of operating a speech dialogue system which communicates with a user while a speech recognition device and/or a speech output device and a dialogue control unit are used, which unit controls the dialogue run between the user and the speech dialogue system on the basis of a dialogue description. In addition, the invention relates to a corresponding speech dialogue system in a computer program with program code means to carry out the method.

Speech dialogue systems communicating with a user while speech recognition and/or speech output devices are used have been known for a long time. They are speech-controlled automatic systems which are often also referred to as voice portals or speech applications. An example for this are automatic telephone answering systems and information systems as they have meanwhile been used, for example, by several larger companies and offices to supply a caller with the desired information as fast and comfortable as possible or connect him to a place that is responsible for the special desires of the caller. Further examples for this are the automatic directory assistance as it has already been used by several telephone companies, automatic timetable information or an information service with general event information for a certain region, for example, cinema or theater programs. Naturally, also combinations of the various information systems are possible, for example, a more complex speech dialogue system in which the user is first to decide whether he wishes to have, for example, information about departures or events or the current weather forecast etc. after which he is then switched through to the desired service. In principle—similarly to, for example, the Internet—any information the user likes to have can be offered to him via such a speech dialogue system. With a speech dialogue system, however, there is the advantage that the user only needs to have a normal telephone connection to be able to utilize the system and ask for information. There is only one condition in this respect that this information can be issued in acoustic form. In so far as the speech dialogue system additionally allows the output of graphic or other data, for example by means of a device with graphic user surface and additional speech control, it is naturally possible for all other information to be issued too.

To control the dialogue run, the speech dialogue system usually has a dialogue control unit (dialogue control). The dialogue run is then controlled with reference to a dialogue description which is stored in a special dialogue descriptor language in the system. This may be any dialogue descriptor language. Customary languages are, for example, method-oriented programming languages such as C or C++, so-called hybrid languages which are declarative and method-oriented languages such as, for example, Voice XML or PSP HDLL which are languages structured similarly to the HTML language customarily used for describing Internet pages. In addition, it may also be a purely graphical dialogue descriptor language in which the individual positions within the dialogue run, for example, a branching point or the retrieval of a certain database, are represented in the form of a graphics block (box) and the connection between the blocks by lines.

It is obvious that with increasing complexity of a speech dialogue system, on the one hand, more information can be rendered available to the user and the system thus offers a greater advantage and a greater variety of application options. On the other hand, however, with ever growing complexity of the speech dialogue system, the control of the system or "navigation" through the system to find desired information becomes ever more costly, complex and time-consuming for the user. It is to be borne in mind that the advantage of the simple use of this system by means of a simple telephone is faced with the disadvantage that the information available to the user cannot be offered visually side by side but in each position along the dialogue run the dialogue system as a rule has to list various alternatives for which the user then decides. If the user has erroneously given a wrong answer with respect to the information he wishes to have, or having received the information comes to conclusion that he wishes to have additional information from other domains, he often has to start from the beginning of the dialogue again which in present-day information systems is implemented such that the user interrupts the connection and again, contacts the speech dialogue system.

It is an object of the present invention to provide an alternative to the known state of the art which allows the user to most comfortably navigate in a speech dialogue system.

This object is achieved by a method and by a speech dialog system of various representative embodiments.

According to the invention, certain positions in the dialogue run, which positions can be reached during a dialogue between the user and the speech dialogue system, are marked as entry positions in the speech dialogue system. For this purpose, an address belonging to the respective position in the dialogue description is stored together with a marker assigned to the position. With a later entry of the stored marker by the user, the speech dialogue system can then automatically jump to the assigned address in the dialogue description and carry on with the dialogue from the respective position onwards.

The type of address that is stored depends in essence on the specific dialogue descriptor language used. In a method-oriented or hybrid descriptor language the program code is normally built up from program code lines. These lines generally have line numbers, so that the respective line number can be used as an address. If a graphical dialogue descriptor language is used, the respective blocks which represent a certain position have an identification number or the like of their own, often also called ID. With such dialogue descriptor languages this block identification number or the like are suitably used as an address.

By marking certain positions, it is no longer necessary for the user, in so far as he knows the marker of the respective position, to run through the whole system from the start to this position, but he can jump to this position any time in a dialogue. In this way it is also possible for the user to mark a position reached and jump back to this position later again if he wishes to have further information and is therefore to reach positions he cannot reach from the current position.

A speech dialogue system according to the invention needs to have, in addition to the customary speech recognition device and the speech output device such as the dialogue control unit with a suitable dialogue description, only means for marking positions in the dialogue run which can be reached as entry positions during a dialogue between the user and the speech dialogue system, these means having to comprise a memory for storing an address in the dialogue description belonging to the position as well as a marker assigned to the position.

To retrieve such a marker i.e. to arrive at the respective marked position, the speech dialogue system needs to have means for automatically jumping to the associated address in the dialogue description when the user has entered a stored marker, and continuing the dialogue from that respective position. This can be realized by a simple run which detects the address assigned to the marker in the memory and passes this address to the respective run of the control unit. Preferably, the stored markers are explicitly added to a word library of the speech recognition device or made accessible for the speech recognition device in another way to guarantee a most reliable recognition of the marker.

The marking of positions may be effected in various ways.

One variant consists of the user autonomously explicitly marking a position reached by him as part of the dialogue as entry position. This is possible in that he jumps to a suitable sub-menu of the dialogue system via a respective command such as "set marking", in which sub-menu the address is stored and assigned to the marker.

The user can then freely select the marker. In a preferred variant of embodiment, however, the speech dialogue system suggests a plurality of possible markers while the user can select one of these markers. It is evident that the speech dialogue system appropriately suggests markers which are linked with the respective position and which can easily be noticed by the user. For example, with a dialogue system the marker "Berlin theaters" can be proposed for querying event information at a position in which the dialogue system calls a theater database of the city of Berlin.

Alternatively, the speech dialogue system can also itself predefine a marker. It is also possible to provide a combination of the various possibilities to mark items. For example, first the speech dialogue system can propose various markers and if the user does not select a marker within a certain period, the speech dialogue system itself will predefine the marker. The user is then only informed about the selection of the marker.

Such a freely selectable marking of certain positions as entry positions in the dialogue run similarly presents a large simplification of the control of the speech dialogue system by the user such as setting so-termed read pointers on the Internet because the user can thus always immediately reach positions he considers important in the dialogue run.

A further possibility of marking certain positions as entry positions consists of the fact that the speech dialogue system automatically offers the user to mark a certain position as entry position when he reaches the respective position in a dialogue and in the sub-menu jumps to the marker of the position in so far as the user accepts this offer.

It is also possible for the speech dialogue system to mark certain positions as entry positions without checking with the user. These positions can be marked for example automatically when reached in the dialogue between user and dialogue system.

Furthermore, important positions in the dialogue description are preferably marked in advance and combined with the markers given in advance. Typical markers which are predefined by this system itself—for example by the provider of the dialogue description—and given fixed names, for example the start position for a help function can be given the marker "help", a position at the beginning of a payment run the marker "payment" or a position with a marker name "demo", which is the start position for a demonstration run of the speech dialogue system.

Preferably, in a certain session the addresses and markers belonging to the entry positions marked during the dialogue are stored as user-specific data in a memory, for example, in a user profile database. The data can then be called up from the memory of the system in a next session, so that the user-specific data are also available to the user in this period for controlling the dialogue system. The user can thus, for example, as is usual, cause the speech dialogue system to automatically jump to the assigned address within the dialogue description by entering a speech marker stored in a previous session, and carry on with the dialogue from this position. The memory for the user-specific data is preferably located in a computer on the side of the speech dialogue system or of the provider of the speech dialogue system, respectively. A further alternative comprises that the data are locally stored in the device which is used by the user for the call.

The positions in the dialogue run as well as their associated data which can be reached and are marked in general by the system—independently of the respective user's dialogue with the dialogue system—can be stored in a general memory or a general database, respectively, which is available to all the users of the speech dialogue system instead of being stored in a user profile database or a user-specific memory composed for the user.

When an entry position is marked together with the address belonging to the position in the dialogue description and also the marker, in a particularly preferred example of embodiment certain environment parameters which are needed for a further dialogue at a position are stored. For example, such environment parameters are a name or an address of a database to be called as well as the parameters to be transferred to the database at this position, such as the point of departure in a timetable, the destination and/or a desired time of departure. In this manner it is not only possible for the user to reach a certain position, but the system is automatically configured at this position so that the user obtains the desired information in the fastest way possible without the need to enter further parameters.

Preferably, the environment parameters are also stored as user-specific data, for example, in the user profile database to be available for future sessions between the user and the speech dialogue system. For example, a user who calls the same dialogue system on a more frequent basis, to be informed of certain times of departure from the Aachen railway station, can, after reaching the position in the dialogue run in which the system calls the timetable database and, afterwards, the point of departure has already been entered as a parameter, set a marker so that the point of departure is stored together with this marker. In case of a later call of this position via the given marker, the user immediately arrives at this position in the dialogue run and, automatically, the point of departure is given to the database to be called so that the user then only needs to enter the destination and time of departure.

With general positions pre-marked for all the users of the system, the user-independent environment parameters can also be stored in a general memory.

In a further preferred embodiment, when an entry position is marked, one or preferably more keywords are stored together with the further data, with the notion content of the keywords having a connection to the marked entry position in the dialogue run. This may be effected automatically by the speech dialogue system or desired keywords are entered by the user himself. For example, the keywords "DB", "train", "timetable", "German Railways", "route" can be assigned to a position which provides a call of a timetable database.

These keywords may be used as possible keys, for example, in a search function. In such a search function which can be activated, for example, by calling a sub-menu by a respective command such as "search", the user can enter a keyword. The speech dialogue system will then, after the entry of such a keyword, automatically search among the keywords of the individual marked positions and, in so far as there is only one position with this keyword, automatically transfer the dialogue to the associated entry position i.e. jump to the assigned address in the dialogue description. In so far as there are more than one entry positions having this keyword, the system can issue the markers of the various entry positions to the user, so that the user can then reach the desired position by entering a marker.

Such a search function can also be activated by the user without an explicit call, for example always when the user enters a concept as a desired marker, but no marker is stored in this form. The detection by the speech dialogue system of an unknown concept entered by the user automatically leads in this case to the searching for associated marked positions via the keywords.

The keywords are also appropriately stored, for example, in the user profile database to be available for later sessions. With the positions pre-marked by the system again keywords generally defined for all users can be stored in a general memory.

This search function is a help, on the one hand, when the user himself has forgotten his markers set by himself. More particularly, however, it is appropriate to find the marked positions predefined by the system, which positions are as a rule positions at which a certain service of the dialogue system, for example, a help run or a query of a certain database begins. Since the associated markers of these "pre-marked" positions are normally not known to the user at first, it is appropriate if exactly these marked positions are combined with very many useful keywords so that the user can find the respective positions very fast via the keywords.

During a search also similarities between the keywords and the keys or sentences or word sequences respectively entered by the user can be taken-into account. The synonym lexicon used by the speech recognition lexicon anyhow can partly be used here for this purpose.

To find the position that matches best the names entered, also an arbitrary degree of similarity can be defined and with the aid of this degree of similarity the position having the largest match with the concept or sentence entered can be chosen. A possible degree of similarity is, for example, the comparison of the word sequence and keys entered, it being established how many of the words in the word sequence correspond to the keys. Words not carrying a concept may be left discarded.

In a further preferred example of embodiment the speech dialogue system stores protocol data when an entry position is marked or when a position already marked is reached during a dialogue between the user and the dialogue system. These protocol data contain information about the order in which the respective entry position with respect to other entry positions was reached during the dialogue.

Also these protocol data are preferably stored in a memory assigned to the user, for example, in the user profile database for subsequent sessions.

The protocol data may be either information which is stored together with the address belonging to the position and the marker, for example, a running number. Alternatively it is possible to separately store the positions or the associated addresses and/or the associated markers in a separate chronological protocol list.

Storing the protocol data is particularly suitable if positions are marked regularly. This may be effected by the speech dialogue system in that this system automatically performs a marking either at regular time intervals or when certain essential positions are reached. Typical essential positions at which markers which include protocol data could be made are, for example, a position prior to a query of a certain database while the database query is appropriately stored with all environment parameters, a position before a call transfer for which the requested number could then be stored, a position at a change to another service or a call for a help function or a demo function.

Such a marking which in the first line serves for the program run may also be effected hidden, the dialogue system automatically storing the address together with an automatically stored marker and the protocol data without counseling the respective user. When a position is reached that has already been marked as an entry position, it is sufficient for the system only to store the new additional protocol data. These protocol data can, in addition to older protocol data, be stored or the old protocol data can be overwritten.

In a preferred example of embodiment the storage of the protocol data allows the user to control the speech dialogue system while using protocol data, so that he again rapidly reaches an entry position marked and reached during the dialogue in a current session or in a previous session.

In an example of embodiment the user can explicitly call a special protocol function or history function by a respective command, for example "history". For navigation with the protocol data the speech dialogue system can for example issue the markers of at least of part of the entry positions to the user in a sub-menu in chronological order and the user can then select one of the markers and thus jump to the desired address.

Similarly, the user can enter navigation commands such as "back", "previous position", "next position" with these protocol data in the running dialogue. With such functions, which can easily be activated based on stored protocol data, it is always possible for the user to jump back to a position when he notices that he has made a mistake in his latest entry.

The means necessary for performing the method can be implemented, in principle, purely in software form on a suitable computer which includes the respective software modules such as automatic speech recognition, a speech output device, for example, a TTS system (Text To Speech), a system control module, a dialogue control module and respective databases. This computer is to have either a suitable connection to a communication network, for example, a telephone interface or, if it is an on-site system, for example, a speech information terminal, a microphone and a loudspeaker. According to the invention only a memory is to be arranged in addition and the system control module or the dialogue control module respectively is to be reprogrammed, so that the necessary data such as the addresses of the positions in the dialogue description and the desired markers can be stored.

The various modules may then furthermore also be installed on various interlinked computers instead of on a single computer. For example, a first computer which can be reached via the telephone interface may include the system control module, the dialogue control module and a speech output device, whereas the relatively computer-intensive automatic speech recognition is carried out on a second computer, as required.

The dialogue system preferably also includes a respective run for processing the markers and, for example, having markers removed again by the users in that the associated data are erased. Similarly, the markers can be changed in that, for example, another marker is selected. Similarly, it is possible to sort the markers, for example, in a list of their own and sort and group them under generic terms or issuing all the markers or associated markers existing thus far to select a marker from them.

The user can additionally add keys as keywords or change the keys at positions already stored by the system or marked by it.

These and other aspects of the invention are apparent from and will be elucidated with reference to the embodiments described hereinafter.

Figure 2:
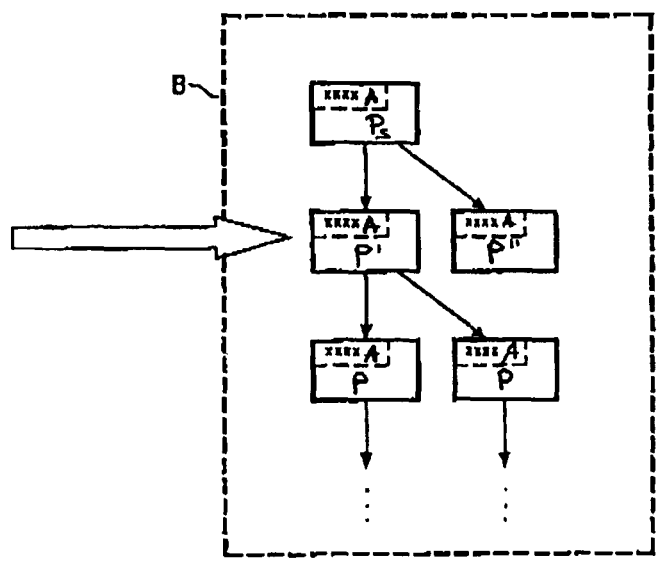
Figure 3:
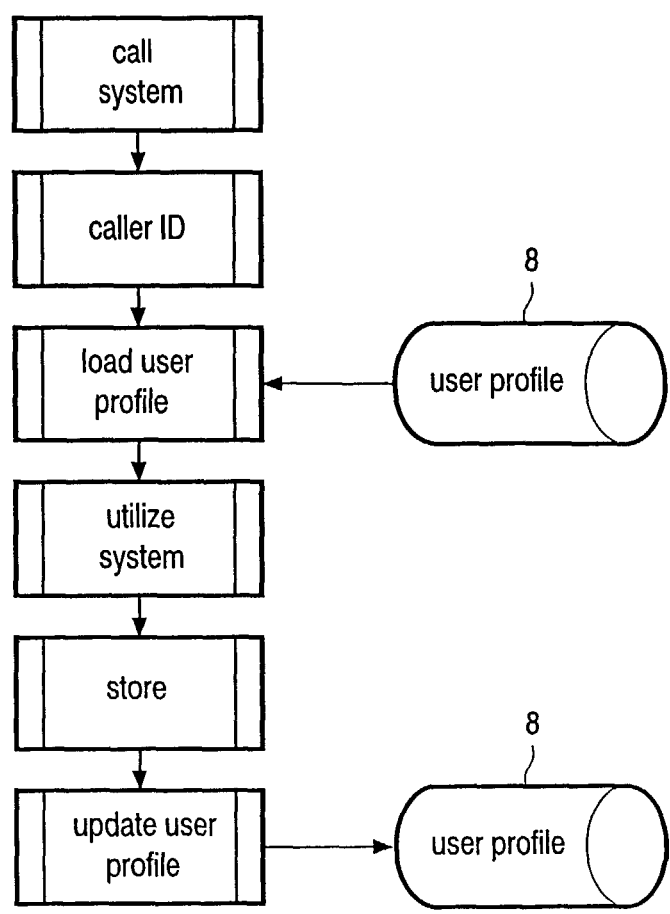

In the drawings:

FIG. 1 shows a schematic block diagram of a speech dialogue system according to the invention, FIG. 2 gives a diagrammatic representation of a section of a dialogue description written in a graphical descriptor language, FIG. 3 is a flow chart of a run of a use of the speech dialogue system by a user while data from a user profile database are utilized.

The example of embodiment shown in FIG. 1 is a typical speech dialogue system 1. This speech dialogue system 1 comprises a communication interface, here a telephone line unit 7 for connection to the user. The user can call the speech dialogue system 1 by any telephone via this telephone line unit 7. A system control unit 6, usually a software module, controls the interaction of all further units 2, 3, 4, 5, 8 of the speech dialogue system 1 and forms the interface between these units 2, 3, 4, 5, 8 and the telephone line unit 7.

A conventional speech recognition module 2 as well as a speech output device 3 belong to the customary further units. It may be, for example, a TTS (Text To Speech) system which converts text data into speech, or suitable file management with various sound files with pre-fabricated speech output sequences. This, however, may also be a mixed system of a TTS module and sound files.

Furthermore, the speech dialogue system 1 comprises a dialogue control unit 4 which controls the dialogue with a user with the aid of a dialogue description B. Here too it is customarily a software module.

Optionally, however, in most speech dialogue systems, there is a specific application database 5 available in the system 1, for example, a database of a train timetable and/or even information etc.

The speech dialogue system 1 according to the invention further additionally includes a further memory 8 and a user profile database. In this database are stored a great variety of user profiles of the users known to the system 1.

More particularly, the address A of a certain position P' in the dialogue description B and an associated selected marker M are stored in this database if a certain position P' is to be marked in the dialogue run.

FIG. 2 shows for this purpose a typical dialogue description B with a graphical dialogue descriptor language being used here in which the individual positions P, $P_S$, P', P''' are represented by blocks which can each be identified as address A via a respective so-termed ID. The Figure shows the start of the dialogue when the speech dialogue system 1 is called. In reality the dialogue description B is many times longer or continues at will.

In the example of embodiment shown the user is just at the position P' which is featured by the arrow. The user is presented with this position P', for example, after a respective response to a query in the upper start position $P_S$ in which he has the choice of ending up in the position P''' or in the position P'.

In so far as the user would like to mark this position P' as entry position, he gives a respective command and, automatically, the speech dialogue system 1 stores the address A of the position P' in memory 8 and, additionally, a marker M is selected for this address A, which marker is also stored in the memory 8. This marker M can be freely selected by the user or the system suggests various markers.

At certain time intervals or when certain important positions are reached, the speech dialogue system additionally automatically sets markers for storing the associated address A and by selecting a marker M. These data are also stored in the memory 8. For several special positions the system has already stored respective markers in advance.

For several positions environment parameters U, for example certain parameters to be transferred to a data base or the database name itself which is necessary for this position are stored together with the address A and the selected or predefined marker M. Furthermore, certain keys S are additionally stored as search concepts, these keys S being linked to the respective position P or function which is available at this position P.

The user can then at any later time reach a desired marked position P' simply by entering the marker M. For this purpose the speech dialogue system, once the marker M has been uttered by the user and recognized by the speech recognition module 2 then searches for the associated address A from the memory 8 or from the user profile database respectively in response to the recognized marker M and jumps to this address A of the dialogue description B. Furthermore, the environment parameters U are simultaneously passed on, so that the user can continue with position P without again selecting the environment parameters U.

In so far as the user has forgotten the marker M or, for example, when the user does not even know marker M if a position P has automatically or previously been marked by the system, it is possible for him to enter various search concepts or a name or a complete word sequence expected by him to be true for the marker, and this concept or this word sequence is compared with the keys S and in this way the associated position P or the associated address A in the dialogue description B is found.

FIG. 3 shows the run of the use of the speech dialogue system while the user profile database stored in the memory 8 is utilized.

In a first step the user calls the system. In a further step the call identification takes place. This may be effected in various ways. One possibility is the so-termed calling line identification in which the identification is made based on the caller's transmitted telephone number. A further possibility is that the user is to log on explicitly, for example, by entering a user name and a user password or a PIN. A further variant is that a speaker verification is made in that the computer carries out a speech analysis based on certain speaker features and, on the basis of this analysis and on the basis of features of a certain user's speech already stored identifies him.

Once the user has been identified, the user profile is downloaded from the user profile database 8. This user profile database is arranged here, as is shown in FIG. 1, in the speech dialogue system 1 itself.

Together with the user profile the speech dialogue system 1 receives all information about latest use or latest uses of the speech dialogue system 1. This information includes the data of the positions marked by the user himself, the protocol data H containing the information in what order the user has passed the marked positions P in the dialogue run—that is the positions P marked himself and the positions P marked by the system—as well as the keywords belonging to the positions. This means that the speech dialogue system 1 receives via the user profile all the user-specific data which can further be used for controlling the speech dialogue system.

For loading the user profile the speech dialogue system 1 is to take the following steps internally. First the system is to make a request to the user profile database for the respective calling user. Then the data are to be transferred from the user profile database to the speech dialogue system 1, for example, the system control module 6 or the dialogue control module 4.

More particularly the markers M belonging to the individually marked positions P are transferred to a lexicon of the speech recognition module 2, so that this module recognizes the markers M when the user mentions the markers M.

In a further step the user can then utilize the speech dialogue system 1 and make use of the various helps which are available on the basis of the markers of the positions P' and on the basis of the user-specific data. More particularly he can utter markers M which are recognized by the speech recognition module 2 after which the dialogue control unit 4 provides that the speech dialogue system 1 jumps to the address A belonging to the desired position in the dialogue description B. The environment variables U stored at the address A belonging to this position P' are simultaneously automatically used to appropriately set the speech dialogue system 1 to the position P'.

When the user utilizes the system he can delete markers or add new markers or change markers respectively at any time, i.e. during the dialogue, for example by changing the associated marker M or by adding or changing the associated keywords S or environment parameters U. Furthermore, in accordance with the further dialogue, the protocol data H are changed or completed respectively. Internally, the speech dialogue system logs all the changes and the further dialogue. If the user likes to abandon the speech dialogue system, he only needs to lay down the telephone and interrupt the connection. Subsequently, the speech dialogue system 1 updates the user profile and stores same in the user profile database 8 for example by means of the system control module 6.

When a user contacts the speech dialogue system 1 for the first time, there is no user profile available for this user in the user profile database i.e. no data are available of marked positions P' or protocol data H about positions already marked. In that case the system establishes a user profile during the first use and stores the user profile in the user profile database after the user has terminated the use.

It is obvious that in an example of embodiment in which the user profile database is accommodated in a user's device, the updating of the user profile and the storage of the user profile in the user profile database is to take place before the connection between the user's device and the speech dialogue system 1 is interrupted.

The user profile database preferably contains only the purely user-specific data. All data used in general for all the users, for example, general markers established by the system and the keywords generally defined for this purpose, are stored in a general speech dialogue system memory that can be used by all the users.

In the following still further examples will be given for various markers of positions:

An example for a user-defined marker is the marker of a position known by the name of "daily Telecom share price". If the user enters this marker the speech dialogue system immediately starts with the share price information service and utilizes "German Telecom" as a share name as well as the current time as environment data to carry out a respective query of share prices with the database of the share price information service on the respective day.

An example of a position already marked by the system is a position marked "weather report" which leads the user directly to a weather report service. Further examples for such markers are positioned among the markers "help" or "demo" via which a user receives information on how the speech dialogue system can be used. This information may furthermore be context-dependent i.e. it may depend, for example, on the position in the dialogue run at which the user finds himself while he is uttering the respective marker. This also means that the marked positions predefined by the system itself can utilize environment parameters.

A good example for the use of a search function is a situation in which a user who rarely uses the system has forgotten the correct marker "daily Telecom share price" and instead says "today's Telecom shares". The system does not know any corresponding marker but can, together with a search function, try and find the desired position or desired marker respectively on the basis of the keywords entered. It then offers, for example, all similar markers or all markers whose keywords are similar to the name entered.

The invention claimed is:

1. A method of operating a speech dialogue system adapted to communicate with a user while a speech recognition device and a speech output device and a dialogue control unit are used, the method comprising:
controlling a dialogue run between a user and a speech dialogue system on the basis of a dialogue description;
marking at least a certain position that can be reached during a dialogue between the user and the speech dialogue system in the dialogue run as an entry position in the speech dialogue system;
storing an address belonging to the position in the dialogue description together with a marker assigned to the position;
automatically selecting the assigned address in the dialogue description if the user enters the stored marker at a later instant and the dialogue is continued from the respective position onwards,
wherein when an entry position is marked, environment parameters are stored which environmental parameters are needed by the dialogue control unit for a further dialogue at the marked position, the environmental parameters include an address of a database and a parameter which is transferred to the database when the stored marker is selected.

2. The method according to claim 1, wherein when a position is marked as an entry position, the speech dialogue system suggests various possible markers to the user from which the user can select a marker belonging to this position and wherein the speech dialogue system predefine the possible markers.

3. The method according to claim 1, further including: when a marked entry position is reached in the dialogue, storing the order in which the marked entry position was reached relative to other marked entry positions during the dialogue.

4. A method as claimed in claim 3, wherein the user controls the speech dialogue system while using the protocol data, so that he again reaches a marked entry position reached during the previous dialogue in a current session and/or a previous session.

5. A method of operating a speech dialog system which includes a speech recognition unit which receives spoken inputs from a user, a speech output device which delivers spoken outputs to the user, and a speech dialog control unit which controls a spoken dialog with the user based on a speech dialog description, the method comprising:
controlling the spoken dialog with the user based on the speech dialog description;
during the spoken dialog, marking an entry position in the spoken dialog with a corresponding marker;
storing the marker, an address in the speech dialog description corresponding to the marked position in the spoken dialog, and a user selection for an input to be input at the marked position;

in response to the user inputting the stored marker at a later time, selecting the address in the speech dialog description corresponding to the marked entry position and inputting the user selection at the marked entry position such that the spoken dialog continues from the marked position without the user inputting a user selection.

6. The method according to claim 5, wherein marking the position includes:

with the speech dialog system, suggesting potential markers;

inputting a user selection of one of the potential markers.

7. The method according to claim 5, wherein the storing step further includes:

storing an order in which the user reached the marked entry position relative to other marked positions.

8. The method according to claim 5, wherein the stored user selection includes an address of a database.

9. The method according to claim 5, wherein the stored user selection includes an address of a database and a parameter to be transferred to the database such that the user reaches a corresponding position in the database.

10. The method according to claim 9, wherein the user reaches the corresponding position in the database in response to inputting the marker and without further user inputs.

11. The method according to claim 9, wherein the database includes a timetable.

12. The method according to claim 9, wherein the database includes a transportation timetable.

13. The method according to claim 12, wherein the parameter is a point of departure.

14. The method according to claim 9, further including:

receiving the parameter in a user input;

searching for the marker stored with the parameter.

15. The method according to claim 5, wherein the user selection includes a keyword.

16. The method according to claim 15, further including:

storing a plurality of markers and corresponding keywords;

receiving an input keyword;

retrieving one or more markers which are stored with the received keyword.

17. The method according to claim 16, wherein the marker for each position is predefined by the speech dialog system.

* * * * *